July 28, 1925.

M. E. BRAND

ANIMAL TRAP

Filed April 27, 1925

1,547,894

Inventor
Mathias E. Brand

Patented July 28, 1925.

1,547,894

UNITED STATES PATENT OFFICE.

MATHIAS E. BRAND, OF BANGOR, WISCONSIN.

ANIMAL TRAP.

Application filed April 27, 1925. Serial No. 26,227.

*To all whom it may concern:*

Be it known that I, MATHIAS E. BRAND, a citizen of the United States, residing at Bangor, in the county of La Crosse and State of Wisconsin, have invented certain new and useful Improvements in Animal Traps, of which the following is a specification.

The present invention relates to animal traps or snares, and has particular reference to improvements in traps whereby the efficiency of the traps is greatly increased.

In the traps in common use there is always a large percentage of animals that unset the traps without becoming caught therein. This is due to faulty construction in the traps, although if an animal nibbles at the bait from the right angle there is a good likelihood of the trap catching it. However, in practically all of these traps if the animals approach the trap from what might be termed the rear they could easily remove the bait without being caught, even though the trap be unset. It is to overcome this faulty construction that the present invention has been conceived.

An object of this invention is to provide a shield for use with animal traps which will prevent the animals from entering the trap from the rear and removing the bait without being caught therein.

A further object of this invention is to provide a shield or plate which may be pivoted to the trap for the purposes stated and which may be collapsed with the trap so as not to take up excess room when packed for shipment.

The above and various other objects and advantages of this invention will in part be described in and in part understood from the following detailed description of the present preferred embodiment, the same being illustrated in the accompanying drawing, wherein.

Figure 1:
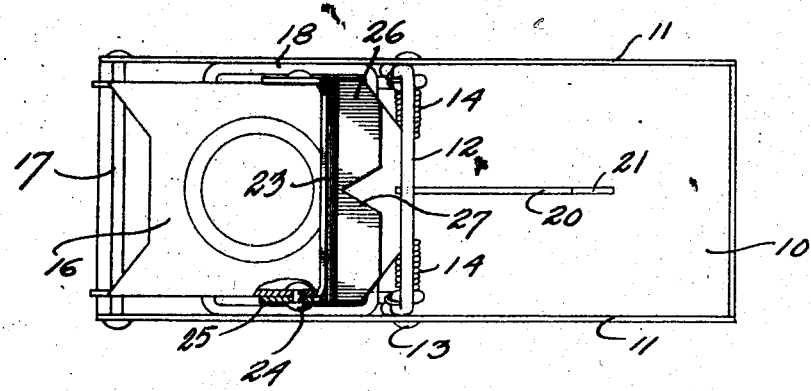
Fig. 1 is a top plan view of an animal trap with a device constructed according to this invention mounted thereon.
Figure 2:
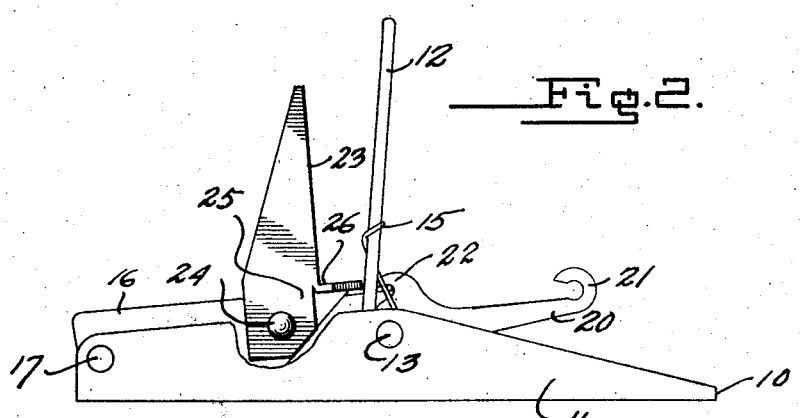
Fig. 2 is a side view of the trap showing the same in set position, and a portion of the side wall being broken away to show the manner of mounting the shield thereon.
Figure 3:
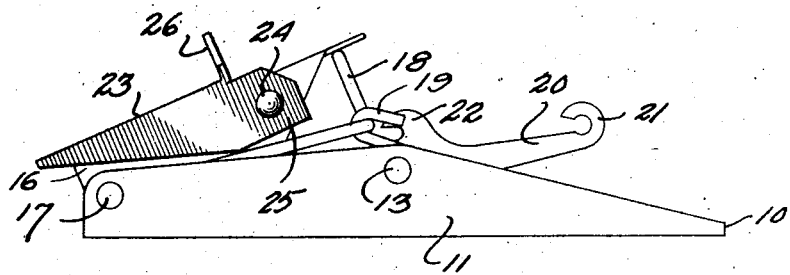
Fig. 3 is a side view of the trap in unset position and with the shield turned downwardly.

Referring to the drawing, 10 designates the base of the trap having upturned side walls 11, the side walls 11 being preferably constructed of the same material as the base 10, the material being bent at right angles to the base to form the sides.

At a point substantially midway along the sides 11 a loop 12 is pivoted to the sides, being preferably mounted on a pivot 13 which is riveted or otherwise fastened against movement on the outer sides of the side walls 11. A pair of coil springs 14 is mounted on the pivot 13, one end of each spring resting on the base 10, and the other end being looped around the loop 12 at a point spaced upwardly from the lower end thereof as indicated at 15.

A foot plate 16 is pivotally mounted on the sides 11 and is mounted on pivot 17 at one end of the trap and extending inwardly thereof. The inner end of the foot plate 16 engages a lever 18, which at its inner end is bent at right angles, and at its outer end is secured to the foot plate 16. A pair of hooks 19 depend from the loop 12 and engage the lever 18 at its inner end so that when pressure is exerted upon the foot plate the lever 18 is moved downwardly and carries with it the hooks 19. As the hooks 19 are constructed from and form a part of the loop 12, the loop is moved upwardly into set position. In order to hold the loop 12 in set position, a trip lever or arm 20 is provided, the outer end of which has a hook or the like 21 for holding bait. The inner end of the lever 20 is pivoted on the pivot 13 in substantially the middle thereof. The lever 20 also has at its inner end a second hook 22 for engaging the inner end of the foot plate to hold the trap in set position.

At a point spaced outwardly from the inner end of the foot plate 16 a shield 23 is pivotally secured to the sides thereof by a pair of rivets 24 or the like, the sides of the shield being bent at right angles to the shield and having a depending lug or arm 25 through which the rivets 24 or the like may extend.

A stop flange 26 is secured to the shield at the inner side thereof, and is adapted to prevent the shield from being forced forwardly against the loop 12 when the trap is set. The stop 26 is preferably cut out at the center thereof as at 27 so that when the shield is standing upright the flange 26 will not interfere with the trip arm 20. The shield 23 may be of any desired length, but is preferably only of sufficient length to prevent the animals from going through the loop 12 when the trap is set and the loop stands upright.

In setting the trap the foot plate is pressed downwardly at its forward end, thereby forcing the lever 18 downwardly. The downward movement of the lever 18 carries with it the hooks 19 which in turn move the loop 12 upwardly until it is substantially vertical. The trip lever 20 then moves upwardly at its forward end and the hook 22 engages the inner end of the foot plate 16. The trap is then in set position. The shield 23 is then moved upwardly and forwardly until the stop 26 prevents further movement of the same. In this position, which is substantially a vertical position, the shield 23 is substantially parallel with the loop 12 and is in close proximity to the loop, being spaced a sufficient distance therefrom so as not to interfere with its subsequent operation when the trap is unset. With the shield 23 in upright position the animals cannot enter the trap by way of the foot plate 16, but must go around to the side or front of the trap and there endeavor to remove the bait. As only a slight movement of the trip arm 20 is necessary to unset the trap there is every assurance that the animals will be caught before the bait is removed from the hook 21.

It is, of course, understood that various changes and modifications may be made in the details of construction and design of the present preferred embodiment of this invention, such changes and modifications being limited only by the scope of the following claims.

What is claimed is:

1. In a trap for catching animals, a base, sides mounted on said base, a loop pivoted to said sides, springs mounted on said loop, a foot plate pivoted to said sides and extending inwardly from one end of said base, a trip lever mounted between said sides and adapted to engage at its inner end said foot plate to hold the trap in set position, and a shield mounted on said foot plate, said shield being adapted to prevent animals from entering the trap over said foot plate.

2. In a trap for catching animals, a base having upturned sides, a loop pivotally mounted between said sides, springs for urging said loop downwardly against the base, a plate pivoted to said sides and extending inwardly from one end of said base, hooks mounted on said loop and depending therefrom, a lever secured to said plate and engaging said hooks, a trip arm pivotally mounted between said sides, and a shield pivotally secured to said plate, said shield being adapted to be swung upwardly when the trap is in set position to prevent animals from entering the trap along said foot plate.

3. In a trap for catching animals, a base having upturned sides, a loop pivotally mounted between said sides, springs for urging said loop downwardly against the base, a foot plate pivotally secured to said sides and extending inwardly from one end of said base, means for raising the loop into substantially vertical position to set the trap, means for holding the trap in set position, and means for preventing animals from entering said trap along said foot plate.

4. In a trap for catching animals, a base having upturned sides, a loop pivotally mounted between said sides, means for urging said loop downwardly against the base, a foot plate pivotally mounted between said sides and at one end of the base, said foot plate extending inwardly of said end, means for raising said loop into substantially vertical position, locking means for holding said loop in set position, and a shield pivotally mounted on said foot plate and transversely thereof, said shield having depending arms for attachment to said foot plate, and a stop for determining the upright position of the shield and preventing the forword movement thereof against said loop.

MATHIAS E. BRAND.